United States Patent
Suenaga

(10) Patent No.: US 12,363,805 B2
(45) Date of Patent: Jul. 15, 2025

(54) DRAWER TYPE HEATING COOKING APPARATUS

(71) Applicant: SHARP KABUSHIKI KAISHA, Sakai (JP)

(72) Inventor: Hiromi Suenaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 816 days.

(21) Appl. No.: 17/636,150

(22) PCT Filed: Aug. 18, 2020

(86) PCT No.: PCT/JP2020/031127
§ 371 (c)(1),
(2) Date: Feb. 17, 2022

(87) PCT Pub. No.: WO2021/033687
PCT Pub. Date: Feb. 25, 2021

(65) Prior Publication Data
US 2022/0295608 A1 Sep. 15, 2022

(30) Foreign Application Priority Data
Aug. 20, 2019 (JP) .................................. 2019-150379

(51) Int. Cl.
*H05B 6/64* (2006.01)
*F24C 15/16* (2006.01)
*F24C 15/32* (2006.01)

(52) U.S. Cl.
CPC ......... *H05B 6/6473* (2013.01); *F24C 15/162* (2013.01); *F24C 15/322* (2013.01)

(58) Field of Classification Search
CPC .. H05B 6/6485; H05B 6/6408; H05B 6/6416; F24C 7/067; F24C 15/325
See application file for complete search history.

(56) References Cited

U.S. PATENT DOCUMENTS 8,253,084 B2  8/2012  Toyoda et al.
10,154,549 B2  12/2018  Nasu et al.
(Continued)

FOREIGN PATENT DOCUMENTS

CN  103884030 A  6/2014
CN  206261491 U  6/2017
(Continued)

OTHER PUBLICATIONS

Third Party Observation concerning the International Application No. PCT/JP2020/031127 mailed on Jul. 5, 2021.

*Primary Examiner* — Thien S Tran
(74) *Attorney, Agent, or Firm* — ScienBiziP, P.C.

(57) ABSTRACT

A drawer type heating cooking apparatus (100) includes a heating chamber (1), a drawer body (2), and an air sending unit (13). The heating chamber (1) includes a heating cooking chamber (100A). The air sending unit (13) supplies hot air into the heating cooking chamber (100A). The heating chamber (1) includes a heating chamber (13A), and a partition plate (13B) configured to divide the heating cooking chamber (100A) and the heating chamber (13A) configured to house a heater (131) and a centrifugal fan (132). The partition plate (13B) includes a blow-out hole section (13C) through which hot air blows into the heating cooking chamber (100A), and a suction hole section (13D). The drawer body (2) includes a placement portion (22), in which an object to be heated is able be placed, and a support portion (23) configured to support the placement portion (22). The blow-out hole section (13C) is located at a position higher than the height of the support portion (23) in a state in which the drawer body (2) is drawn into the heating cooking chamber (100A).

6 Claims, 9 Drawing Sheets

(56) References Cited

U.S. PATENT DOCUMENTS

| | | |
|---|---|---|
| 10,371,391 B2 | 8/2019 | Tcaciuc |
| 2010/0133263 A1 | 6/2010 | Toyoda et al. |
| 2012/0187115 A1 | 7/2012 | Toyoda et al. |
| 2012/0192725 A1 | 8/2012 | Toyoda et al. |
| 2013/0284161 A1* | 10/2013 | Johnson ............... F24C 15/325 |
| | | 126/21 A |
| 2015/0000539 A1* | 1/2015 | Tcaciuc ............... F24C 15/325 |
| | | 99/447 |
| 2017/0171921 A1 | 6/2017 | Nasu et al. |

FOREIGN PATENT DOCUMENTS

| | | | |
|---|---|---|---|
| CN | 206300225 U | * | 7/2017 |
| FR | 2686400 A1 | | 7/1993 |
| JP | S61-038337 A | | 2/1986 |
| JP | H05-025202 U | | 4/1993 |
| JP | 2010-133634 A | | 6/2010 |
| JP | 2016-050699 A | | 4/2016 |
| JP | 2018-136108 A | | 8/2018 |

\* cited by examiner

DRAWER TYPE HEATING COOKING APPARATUS

TECHNICAL FIELD

The present invention relates to drawer type heating cooking apparatuses.

BACKGROUND ART

Drawer type heating cooking apparatuses are widely known. A drawer type heating cooking apparatus includes a heating chamber and a drawer body. The heating chamber includes a heating cooking chamber. The drawer body is integrally formed with an opening/closing door. The drawer body is disposed in such a manner as to be able to be drawn from the heating cooking chamber. Such drawer type heating cooking apparatus is incorporated into a cabinet of a built-in kitchen.

Patent Literature (PTL) 1 discloses a drawer type heating cooking apparatus. The drawer type heating cooking apparatus disclosed in PTL 1 includes a heating cooking apparatus main body and a drawer body. The heating cooking apparatus main body includes a heating cooking chamber. The drawer body is able to be drawn toward the outside of the heating cooking apparatus main body from a state in which the drawer body is accommodated in the heating cooking chamber. The drawer body is constituted of an opening/closing door, side walls, a rear wall, and a bottom wall. The front end portion of each of the side walls and the bottom wall is attached to the opening/closing door. The opening/closing door, the side walls, the rear wall, and the bottom wall form an inner box. Heating functions of the drawer type heating cooking apparatus disclosed in PTL 1 include a microwave heating function and a rapid hot air heating function. The microwave heating function is a function of irradiating microwaves toward an object to be heated. The rapid hot air heating function is a function of blowing hot air at high speed from a ceiling blowing port and a side blowing port toward an object to be heated. The ceiling blowing port is formed in the ceiling wall of the heating cooking chamber. The side blowing port is formed in the left side wall.

CITATION LIST

Patent Literature

PTL 1: JP 2010-133634 A

SUMMARY OF INVENTION

Technical Problem

However, in the drawer type heating cooking apparatus disclosed in PTL 1, the relationship between a position of the side blowing port and a position of the upper end of the side wall of the drawer body is not defined. As such, there is a fear that the side blowing port is located at a position lower than the height of the upper end of the side wall of the drawer body. In a case where the side blowing port is located at a position lower than the height of the upper end of the side wall of the drawer body, the hot air having been blown from the side blowing port is directly blown onto the side wall of the drawer body, whereby the durability of the drawer body becomes likely to be deteriorated.

In light of the above problems, an object of the present invention is to provide a drawer type heating cooking apparatus in which the durability of a drawer body is unlikely to be deteriorated.

Solution to Problem

A drawer type heating cooking apparatus of the present invention includes a heating cooking chamber, a drawer body, an air sending unit, and a partition plate. The drawer body is able to be drawn from the heating cooking chamber. The drawer body is able to be accommodated in the heating cooking chamber. The air sending unit supplies hot air into the heating cooking chamber. The partition plate divides the heating chamber and the heating cooking chamber. The partition plate includes a blow-out hole section and a suction hole section. The blow-out hole section is for blowing the hot air into the heating cooking chamber. The suction hole section is for sucking the hot air within the heating cooking chamber. The drawer body includes a placement portion and a support portion. An object to be heated is able to be placed in the placement portion. The support portion supports the placement portion. The blow-out hole section is located at a position higher than a height of the support portion.

A drawer type heating cooking apparatus of the present invention includes a heating chamber, a drawer body, a microwave supply unit, and an air sending unit. A heating cooking chamber configured to heat an object to be heated is formed inside the heating chamber. The drawer body is able to be drawn from the heating chamber. The drawer body is able to be accommodated in the heating cooking chamber. The microwave supply unit supplies microwaves into the heating cooking chamber. The air sending unit supplies hot air into the heating cooking chamber. The air sending unit includes a heater and a centrifugal fan. The heater heats air. The centrifugal fan blows the air heated by the heater into the heating cooking chamber to generate the hot air. The heating chamber includes a heating chamber and a partition plate. The heating chamber houses the heater and the centrifugal fan. The partition plate divides the heating chamber and the heating cooking chamber. The partition plate includes a blow-out hole section and a suction hole section. The blow-out hole section is for blowing the hot air into the heating cooking chamber. The suction hole section is for sucking the hot air within the heating cooking chamber. The drawer body includes a placement portion and a support portion. The object to be heated is able to be placed in the placement portion. The support portion supports the placement portion. The blow-out hole section is located at a position higher than a height of the support portion in a state in which the drawer body is drawn into the heating cooking chamber.

Advantageous Effects of Invention

According to the drawer type heating cooking apparatus of the present invention, the durability of the drawer body is unlikely to be deteriorated.

DESCRIPTION OF EMBODIMENTS

Figure 1:
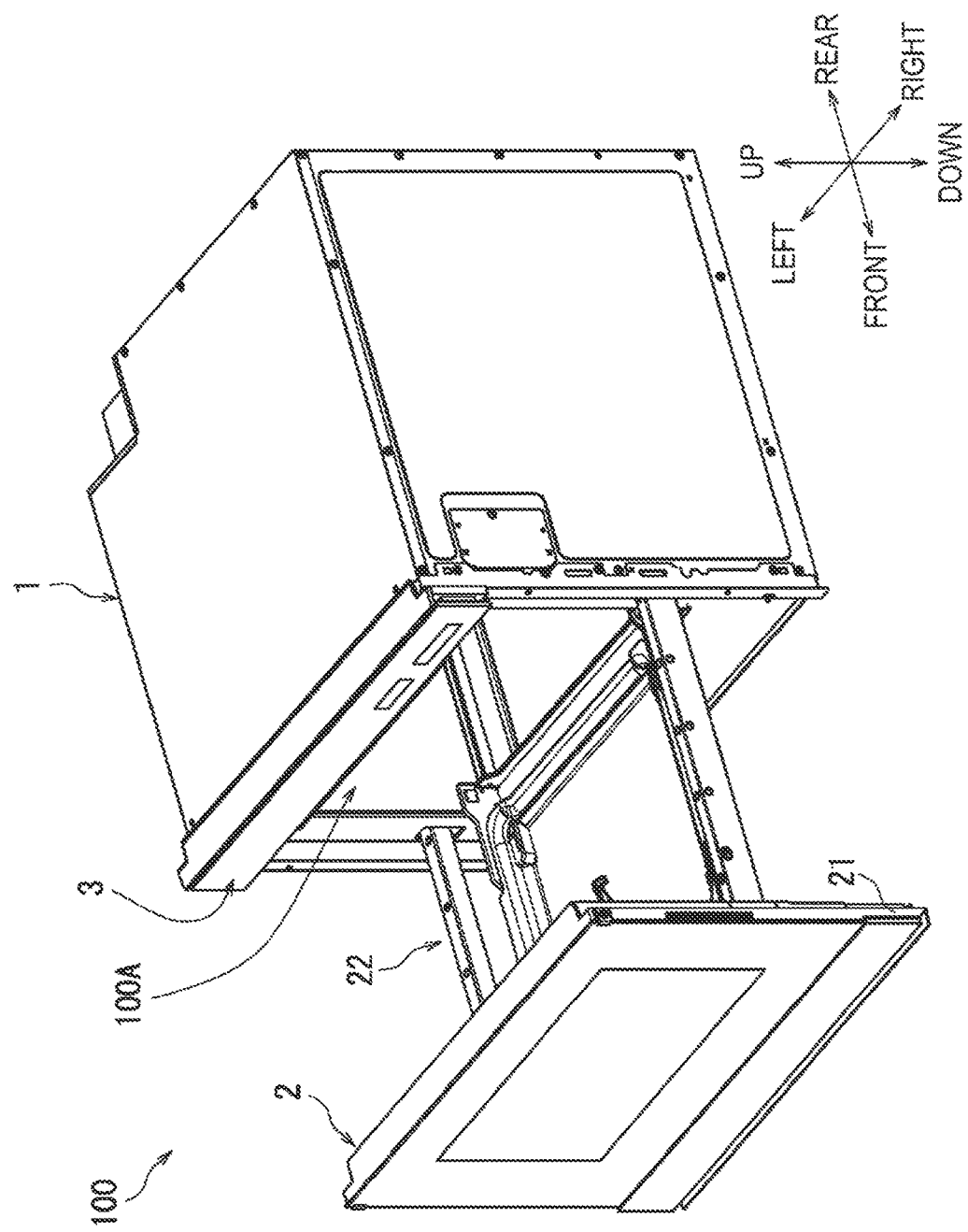
FIG. 1 is a diagram illustrating an appearance of a drawer type heating cooking apparatus according to an embodiment of the present invention.

Hereinafter, an embodiment of a drawer type heating cooking apparatus according to the present invention will be described with reference to the drawings. In the drawings, the same or equivalent components are denoted by the same reference signs and description thereof will not be repeated.

Figure 2:
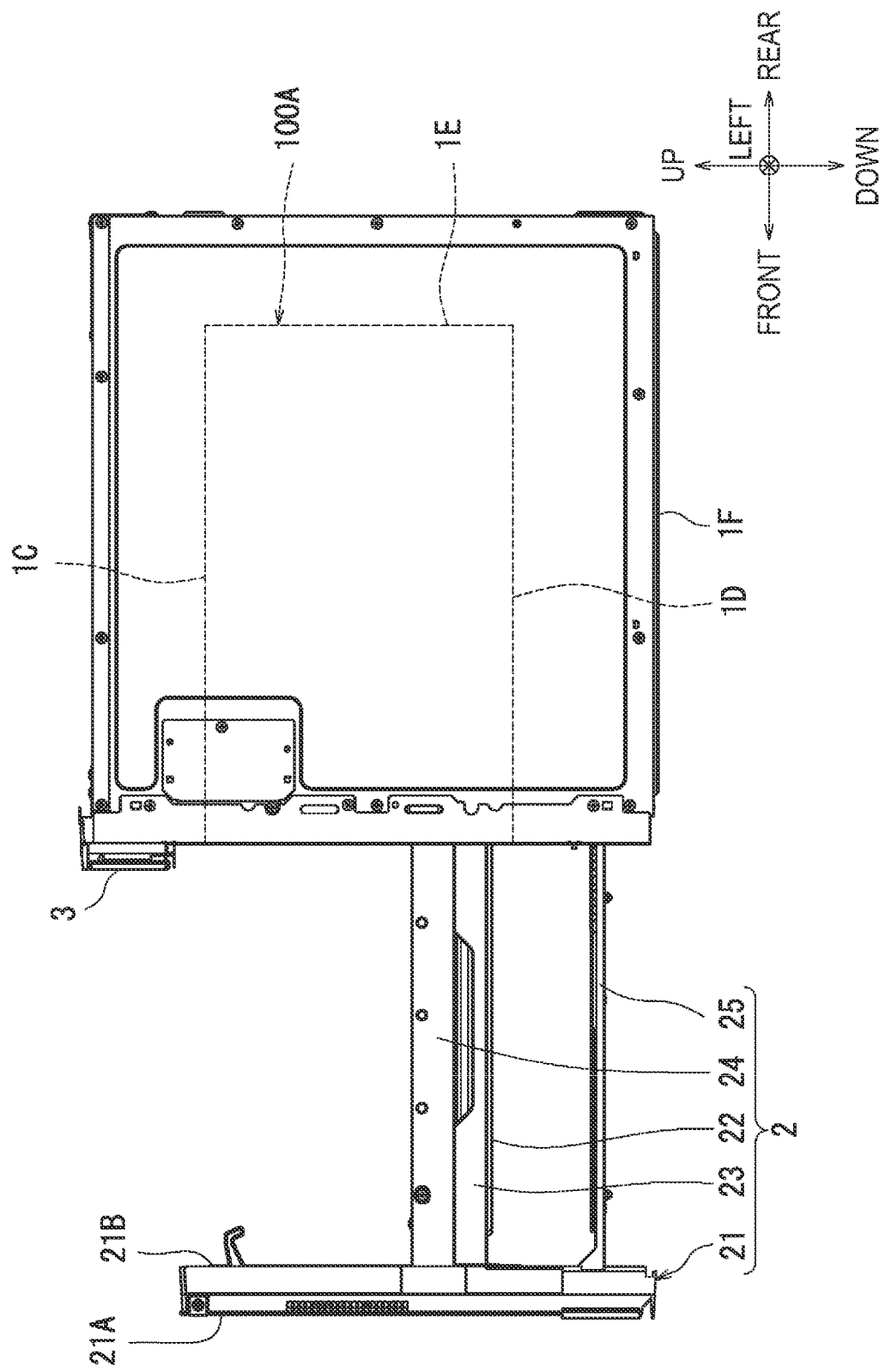
FIG. 2 is a diagram illustrating a right side surface of the drawer type heating cooking apparatus according to the embodiment of the present invention.
Figure 3:
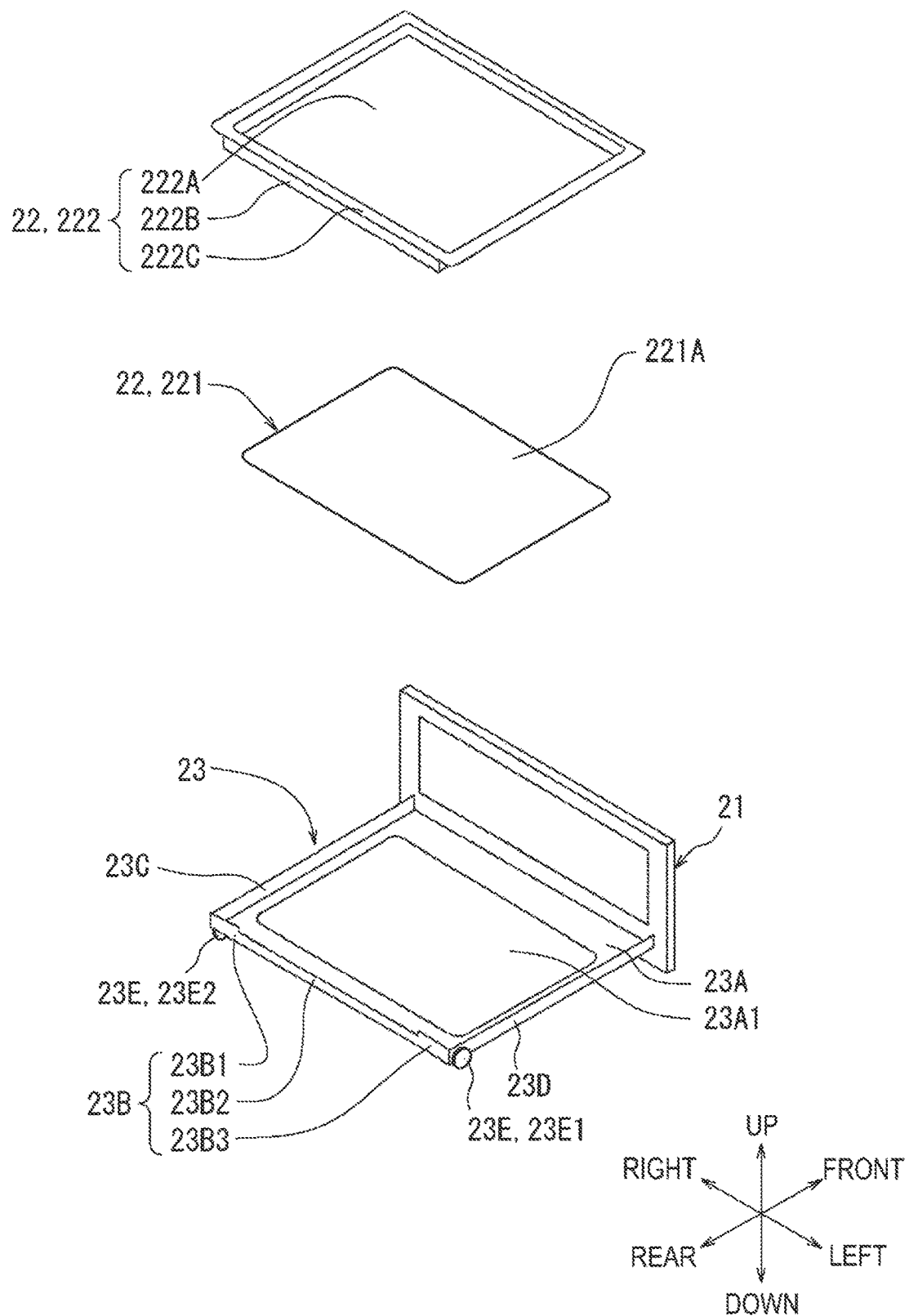
FIG. 3 is an exploded perspective view of a placement portion according to the embodiment of the present invention.
Figure 4:
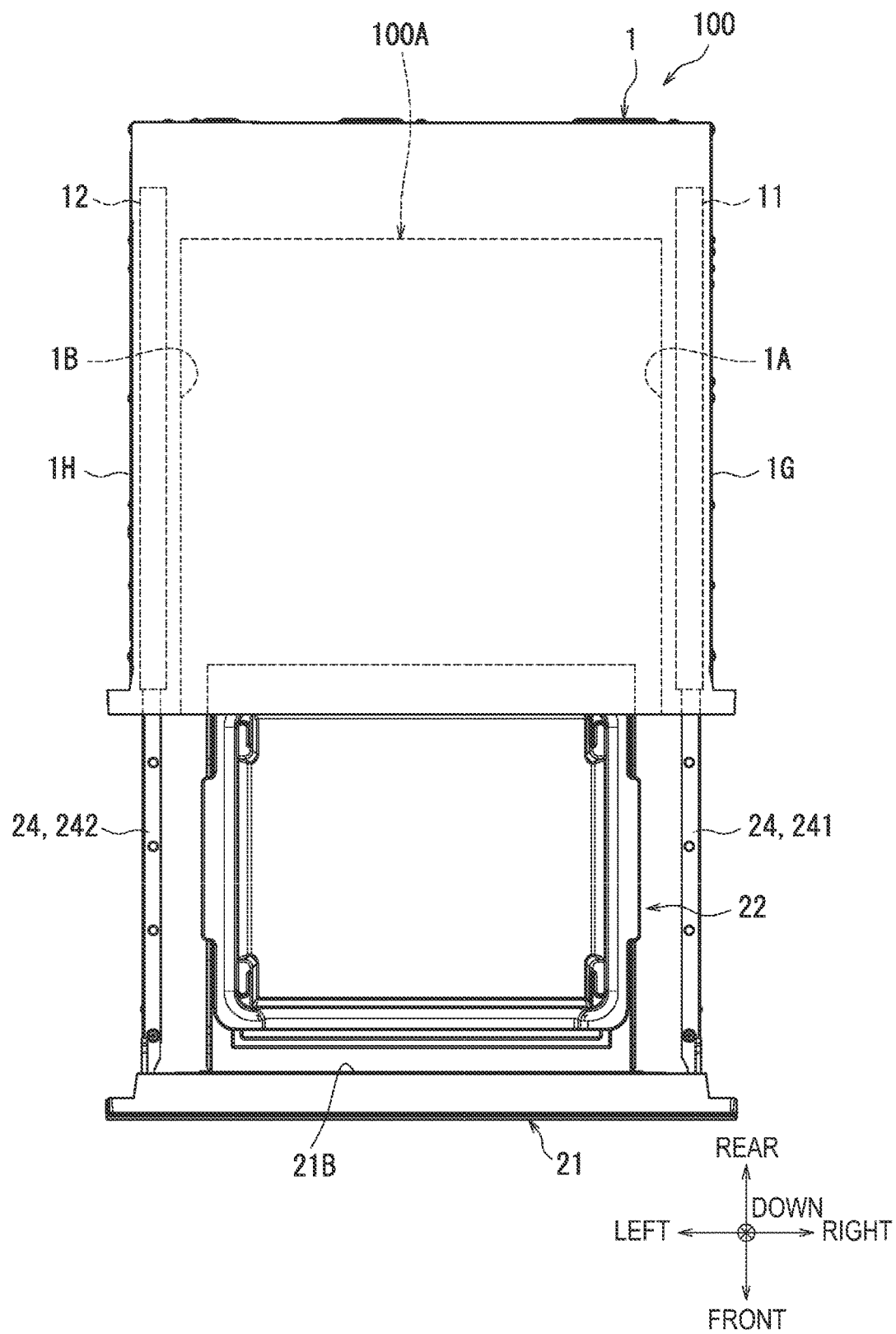
FIG. 4 is a diagram illustrating an upper side view of the drawer type heating cooking apparatus according to the embodiment of the present invention.

A drawer type heating cooking apparatus 100 according to the present embodiment will be described with reference to FIG. 1 to FIG. 4. FIG. 1 is a perspective view of the drawer type heating cooking apparatus 100 according to the present embodiment. FIG. 2 is a right side view of the drawer type heating cooking apparatus 100 according to the present embodiment. FIG. 3 is an exploded perspective view of a placement portion 22 according to the present embodiment. FIG. 4 is an upper side view of the drawer type heating cooking apparatus 100 according to the present embodiment. More specifically, FIG. 1 illustrates an appearance of the drawer type heating cooking apparatus 100 in a state in which a drawer body 2 is drawn, when viewed from above diagonally forward right. FIG. 2 illustrates the drawer type heating cooking apparatus 100 in the state in which the drawer body 2 is drawn. FIG. 3 illustrates a door part 21, a support portion 23, a drawer tray 221, and a cooking tray 222, when viewed from above diagonally backward left. FIG. 4 illustrates the drawer type heating cooking apparatus 100 in the state in which the drawer body 2 is drawn. In FIG. 3, a slide member 24 and a support member 25 are omitted.

The drawer type heating cooking apparatus 100 heats and cooks an object to be heated. The object to be heated is, for example, food. As illustrated in FIG. 1, the drawer type heating cooking apparatus 100 includes a heating chamber 1, the drawer body 2, and an operation panel 3.

In the present embodiment, a side on which the operation panel 3 of the drawer type heating cooking apparatus 100 is disposed is defined as a front side of the drawer type heating cooking apparatus 100, and a side opposite to the front side is defined as a rear side of the drawer type heating cooking apparatus 100. The right side when the drawer type heating cooking apparatus 100 is viewed from the front side is defined as a right side of the drawer type heating cooking apparatus 100, and a side opposite to the right side is defined as a left side of the drawer type heating cooking apparatus 100. Further, in a direction orthogonal to a front-rear direction and a left-right direction of the drawer type heating cooking apparatus 100, a side on which the operation panel 3 is disposed is defined as an upper side of the drawer type heating cooking apparatus 100, and a side opposite to the upper side is defined as a lower side of the drawer type heating cooking apparatus 100. Note that these orientations are not limited to the orientation of the drawer type heating cooking apparatus according to the present invention when in use.

The heating chamber 1 has a box-like shape. The heating chamber 1 includes a heating cooking chamber 100A therein. The heating cooking chamber 100A refers to a space in which an object to be heated is accommodated and then is heated and cooked. The front side of the heating cooking chamber 100A is opened for drawing/putting the drawer body 2 from/into the chamber. Details of the heating chamber 1 will be described later with reference to FIGS. 6 and 7.

In the present embodiment, the drawer type heating cooking apparatus 100 includes, as heating cooking modes, a microwave heating mode, a first hot air circulation heating mode, a second hot air circulation heating mode, and a grill heating mode. The microwave heating mode is mainly a mode in which the object to be heated is heated and cooked by radiating microwaves into the heating cooking chamber 100A. The first hot air circulation heating mode is mainly a mode in which the object to be heated is heated and cooked by circulating a first hot air F1 in the heating cooking chamber 100A to cause the temperature in the heating cooking chamber 100A to be uniform. The second hot air circulation heating mode mainly includes a first mode and a second mode. The first mode is a mode in which the object to be heated is heated and cooked by directly blowing a second hot air F2 onto an upper face of the object to be heated. The second mode is a mode in which the inside of the heating cooking chamber 100A is preheated in a short period of time by circulating the second hot air F2 in the heating cooking chamber 100A. The grill heating mode is mainly a mode in which the object to be heated is heated and cooked by exposing the object to be heated to radiant heat.

The operation panel 3 receives operations from a user. The operation panel 3 is located on an upper portion of a front face of the heating chamber 1. The operation panel 3 includes an operation unit and a display portion. The operation unit receives an operation from a user. The display portion displays various pieces of information.

The drawer body 2 is able to be drawn from the heating chamber 1 and is able to be accommodated in the heating cooking chamber 100A. The drawer body 2 is attached to the heating chamber 1. The drawer body 2 includes the placement portion 22. The object to be heated is able to be placed in the placement portion 22. The placement portion 22 is drawn from the inside of the heating cooking chamber 100A to the outside thereof in a state in which the drawer body 2 is drawn from the inside of the heating cooking chamber 100A. The placement portion 22 is accommodated in the heating cooking chamber 100A in a state in which drawer body 2 is put into the heating cooking chamber 100A.

As illustrated in FIG. 2, the drawer body 2 further includes the door part 21, the support portion 23, a pair of slide members 24, and the support member 25, in addition to the placement portion 22.

The door part 21 can open and close an opening on the front side of the heating cooking chamber 100A. The door part 21 is a substantially rectangular plate-like member. The door part 21 includes a front face 21A and a rear surface 21B. The door part 21 opens the opening on the front side of the heating cooking chamber 100A in a state in which the drawer body 2 is drawn from the heating cooking chamber 100A. The door part 21 closes the opening on the front side of the heating cooking chamber 100A in a state in which the drawer body 2 is drawn into the heating cooking chamber 100A.

The support portion 23 supports the placement portion 22. Details of the support portion 23 will be described later with reference to FIG. 3.

The pair of slide members 24 regulate a movement direction of the drawer body 2 in the front-rear direction. The pair of slide members 24 are fixed to the rear surface 21B of the door part 21. Details of the pair of slide members 24 will be described later with reference to FIG. 4.

The support member 25 regulates the movement direction of the drawer body 2 in the front-rear direction. The support member 25 is attached at a position near central portion in the left-right direction of the rear surface 21B of the door part 21 and on the lower side relative to the placement portion 22. The support member 25 is a plate-like member whose longitudinal direction is the front-rear direction. The support member 25 includes a rack part on the rear side. The rack part includes a plurality of teeth. The heating chamber 1 includes a bottom wall 1D constituting the heating cooking chamber 100A. The heating chamber 1 includes a bottom outer wall 1F constituting an outer wall. The heating chamber 1 includes a space between the bottom wall 1D and the bottom outer wall 1F. The heating chamber 1 includes a drive mechanism 4 to be described later with reference to FIG. 8. The drive mechanism 4 is accommodated in the space formed between the bottom wall 1D and the bottom outer wall 1F. By being engaged with the rack part of the support member 25, the drive mechanism 4 causes the drawer body 2 to be in an opened state or a closed state.

As illustrated in FIG. 3, the drawer body 2 includes the support portion 23 in addition to the placement portion 22. The placement portion 22 includes the drawer tray 221 and the cooking tray 222. The support portion 23, the drawer tray 221, and the cooking tray 222 are overlapped in that order.

The support portion 23 holds the drawer tray 221 and the cooking tray 222. As illustrated in FIG. 3, the support portion 23 includes a bottom plate portion 23A, a back plate portion 23B, a right plate portion 23C, a left plate portion 23D, and a pair of rollers 23E. The bottom plate portion 23A, the back plate portion 23B, the right plate portion 23C, and the left plate portion 23D are plate-like members. The bottom plate portion 23A, the back plate portion 23B, the right plate portion 23C, the left plate portion 23D, and the door part 21 form an inner box. The height of the right plate portion 23C and the height of the left plate portion 23D are substantially equal to each other.

The bottom plate portion 23A has an opening portion 23A1.

The back plate portion 23B includes a first tall portion 23B1, a short portion 23B2, and a second tall portion 23B3. Hereinafter, the first tall portion 23B1 is described as "right tall portion 23B1". Hereinafter, the second tall portion 23B3 is described as "left tall portion 23B3". The short portion 23B2 is located between the right tall portion 23B1 and the left tall portion 23B3 in the left-right direction. The height of the right tall portion 23B1 and the height of the right plate portion 23C are substantially equal to each other. The height of the left tall portion 23B3 and the height of the left plate portion 23D are substantially equal to each other. Since the back plate portion 23B includes the right tall portion 23B1 and the left tall portion 23B3, the generation of a backlash of the support portion 23 may be suppressed.

The height of the short portion 23B2 is lower than the height of each of the right tall portion 23B1 and the left tall portion 23B3.

The pair of rollers 23E rotate as the drawer body 2 moves. The pair of rollers 23E include a right roller 23E2 and a left roller 23E1. The right roller 23E2 is attached to a rear end portion of the right plate portion 23C. The left roller 23E1 is attached to a rear end portion of the left plate portion 23D.

The drawer tray 221 holds an object to be heated or the cooking tray 222. The drawer tray 221 is fitted into the opening portion 23A1 of the bottom plate portion 23A of the support portion 23. The drawer tray 221 is fixed to the bottom plate portion 23A. The drawer tray 221 is a plate-like member. The drawer tray 221 is formed in a substantially rectangular shape when viewed from the upper side toward the lower side. The drawer tray 221 has a top surface portion 221A. The top surface portion 221A constitutes a placement surface for the object to be heated or the cooking tray 222. The top surface portion 221A for the drawer tray 221 is located at a positioned lower than the height of each of the back plate portion 23B, the right plate portion 23C, and the left plate portion 23D of the support portion 23.

The materials of the support portion 23 and the drawer tray 221 include ceramic or glass. This facilitates the transmission of microwaves through the support portion 23 and the drawer tray 221.

The cooking tray 222 functions as an oil catch pan for receiving oil that drips from the object to be heated when the first hot air circulation heating mode, the second hot air circulation heating mode, or the grill heating mode is performed. The cooking tray 222 is detachably mounted on the top surface portion 221A of the drawer tray 221. The cooking tray 222 is a saucer-like member having a bottom. The cooking tray 222 includes a top surface portion 222A, an annular peripheral wall portion 222B, and an annular edge portion 222C. The top surface portion 222A is formed in a substantially rectangular shape when viewed from the upper side toward the lower side. The annular peripheral wall portion 222B is erected from the peripheral edge portion of the top surface portion 222A. The annular edge portion 222C extends outward from the upper end of the annular peripheral wall portion 222B. The top surface portion 222A constitutes the placement surface for the object to be heated. The upper face of the annular edge portion 222C of the cooking tray 222 is located at a positioned lower than the height of each of the back plate portion 23B, the right plate portion 23C, and the left plate portion 23D of the support portion 23 in a state in which the cooking tray 222 is mounted on the top surface portion 221A of the drawer tray 221.

The cooking tray 222 may be detached from the drawer type heating cooking apparatus 100 in accordance with a cooking method for the object to be heated. For example, when the microwave heating mode is performed, the cooking tray 222 may be detached from the drawer type heating cooking apparatus 100. When the microwave heating mode is performed, the object to be heated may be placed on the top surface portion 221A of the drawer tray 221.

As illustrated in FIG. 4, the pair of slide members 24 include a right slide member 241 and a left slide member 242. Each of the right slide member 241 and the left slide member 242 is a tube-like member taking the front-rear direction as its longitudinal direction. Each of the right slide member 241 and the left slide member 242 includes a hollow portion inside thereof. The right slide member 241 and the left slide member 242 oppose each other in the left-right direction. The right slide member 241 is attached to the door part 21. The left slide member 242 is attached to the door part 21. The heating chamber 1 includes a right wall 1A and a left wall 1B constituting the heating cooking chamber 100A. The heating chamber 1 includes a right outer wall 1G and a left outer wall 1H constituting the outer wall. The heating chamber 1 includes a space between the right wall 1A and the right outer wall 1G. The heating chamber 1 includes a space between the left wall 1B and the left outer wall 1H. As illustrated in FIG. 4, the heating chamber 1 includes a right slide rail 11 and a left slide rail 12. The right slide rail 11 is disposed in the space between the right wall 1A and the right outer wall 1G. The left slide rail 12 is disposed in the space between the left wall 1B and the left outer wall 1H. Each of the right slide rail 11 and the left slide rail 12 is a plate-like member taking the front-rear direction as its longitudinal direction.

Figure 5:
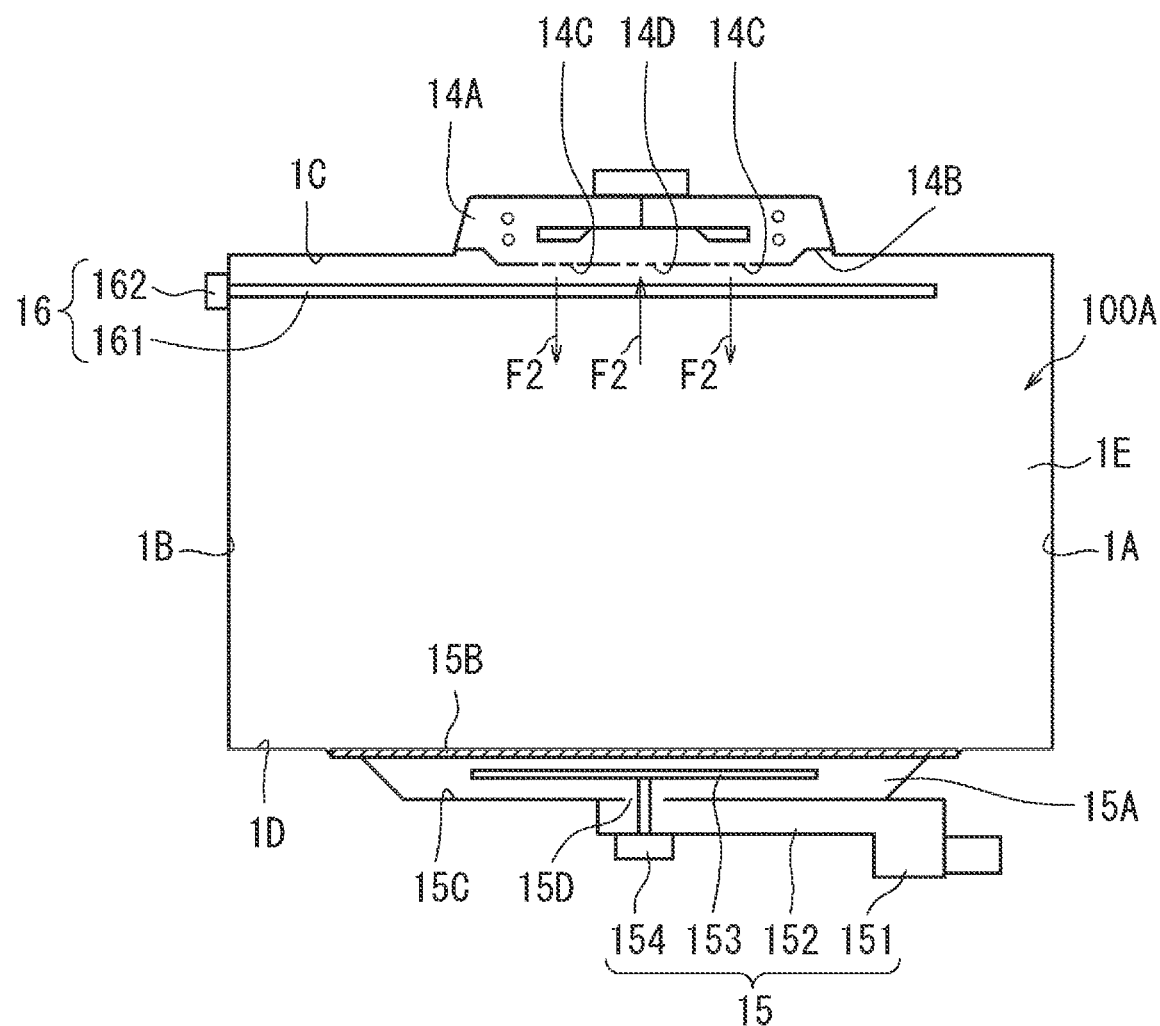
FIG. 5 is a diagram illustrating a schematic cross section of a heating chamber according to the embodiment of the present invention.
Figure 6:
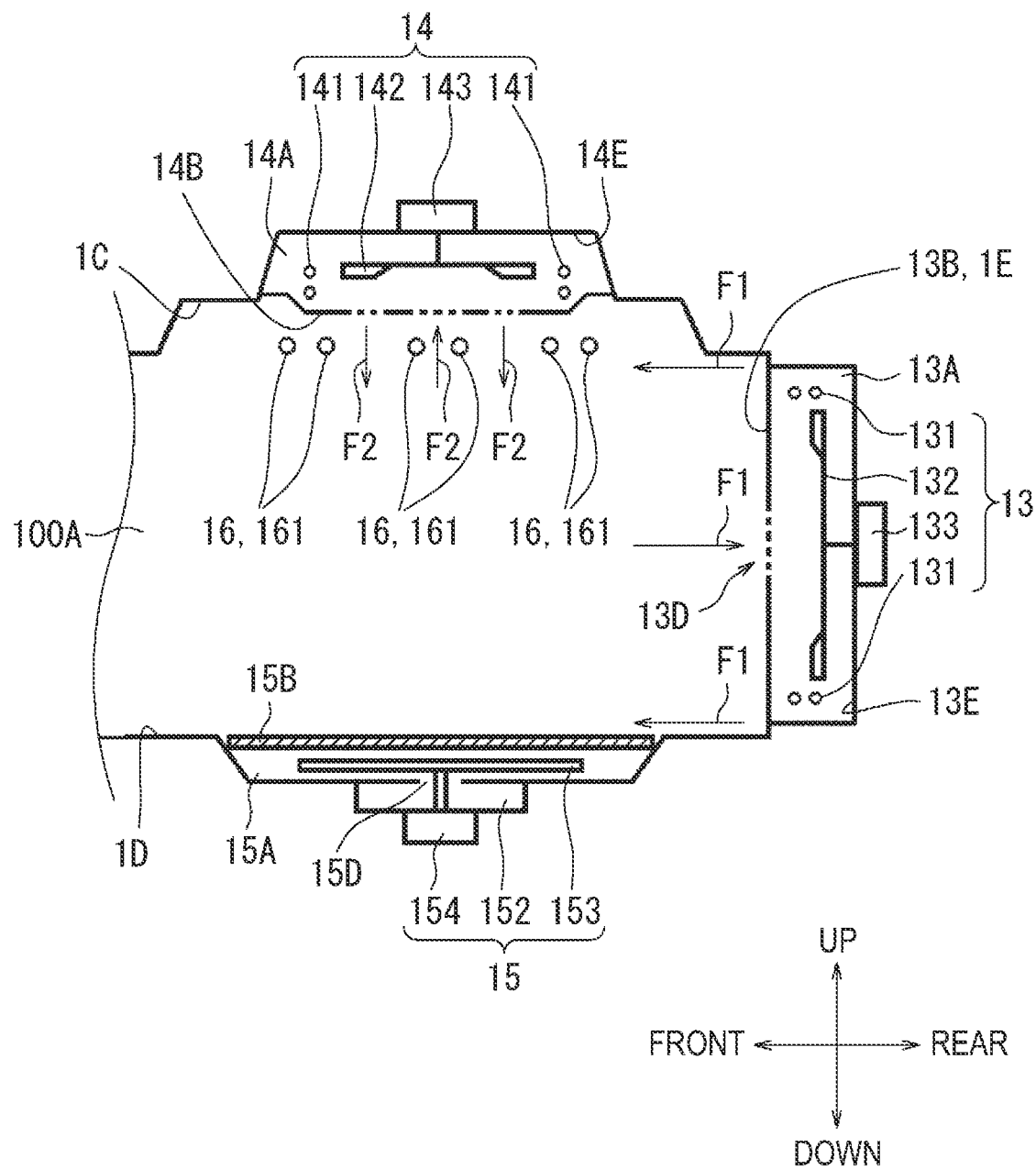
FIG. 6 is a diagram illustrating a schematic cross section of the heating chamber according to the embodiment of the present invention.
Figure 7:
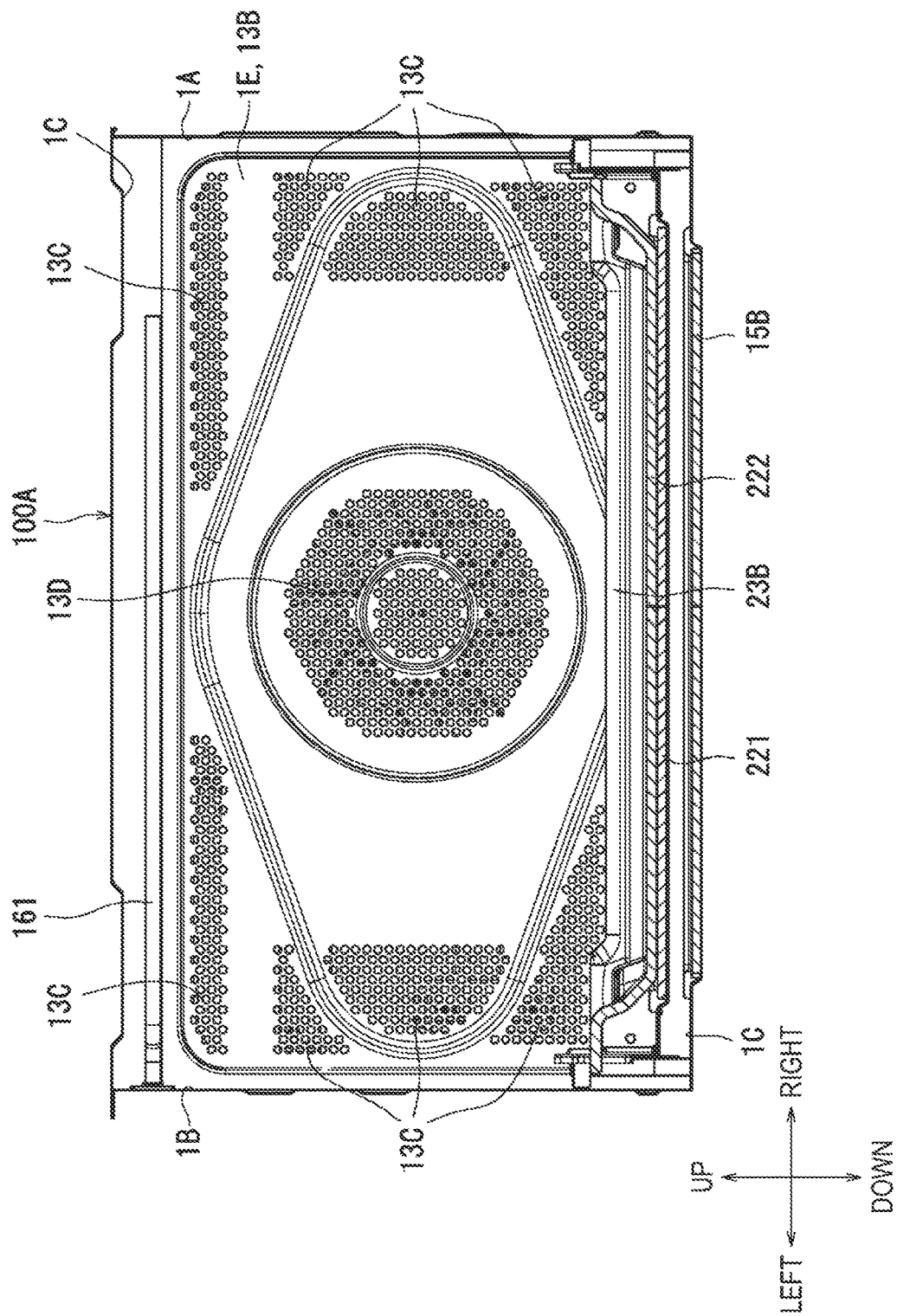
FIG. 7 is a diagram illustrating a front view of a heating cooking chamber of the drawer type heating cooking apparatus according to the embodiment of the present invention.

Next, the heating chamber 1 according to the present embodiment will be further described with reference to FIG. 1 to FIG. 7. FIG. 5 and FIG. 6 are diagrams illustrating a schematic cross section of the heating chamber 1 according to the present embodiment. FIG. 7 is a front view illustrating the heating cooking chamber 100A of the drawer type heating cooking apparatus 100 according to the present embodiment. More specifically, FIG. 5 illustrates a cross section of the heating chamber 1 taken along a plane orthogonal to the front-rear direction. FIG. 6 illustrates a cross section of the heating chamber 1 taken along a plane orthogonal to the left-right direction.

As illustrated in FIG. 5, the heating chamber 1 includes the right wall 1A, the left wall 1B, a ceiling wall 1C, the bottom wall 1D, and a back wall 1E. The heating cooking chamber 100A is constituted by the right wall 1A, the left wall 1B, the ceiling wall 1C, the bottom wall 1D, and the back wall 1E. As illustrated in FIG. 6, the heating chamber 1 further includes a first, heating chamber 13A, a first, partition plate 13B, a second heating chamber 14A, a second partition plate 14B, a third heating chamber 15A, and an oven tray 15B.

The first heating chamber 13A is located outside of the back wall 1E. The first partition plate 13B constitutes substantially the entire surface of the back wall 1E. The first partition plate 13B divides the first heating chamber 13A and the heating cooking chamber 100A. The first partition plate 13B is a plate-like member. As illustrated in FIG. 7, the first partition plate 13B includes a first blow-out hole section 13C and a first suction hole section 13D.

The first blow-out hole section 13C is an aggregate of a plurality of punched holes. Similarly, the first suction hole section 13D is also an aggregate of a plurality of punched holes. The diameter of each punched hole of the first blow-out hole section 13C and the first suction hole section 13D is, for example, 3.4 mm. Since the first blow-out hole section 13C and the first suction hole section 13D are aggregates of the plurality of punched holes, it is possible to suppress the leakage of microwaves to the outside of the heating cooking chamber 100A when the microwave heating mode is performed. In addition, the first blow-out hole section 13C or the first suction hole section 13D makes it possible to suppress the occurrence of an incident in which a fingertip of a user is cut due to the contact of the fingertip of the user with each of the first blow-out hole section 13C and the first suction hole section 13D when cleaning the inside of the heating cooking chamber 100A.

As illustrated in FIG. 7, the first suction hole section 13D is located in a central portion of the back wall 1E. The back wall 1E faces the back plate portion 23B in a state in which the drawer body 2 is drawn into the heating cooking chamber 100A. The first blow-out hole section 13C is located in a peripheral edge portion of the back wall 1E. To rephrase, the first blow-out hole section 13C is located along the edge of the back wall 1E. The first blow-out hole section 13C and the first suction hole section 13D are located at a position higher than the height of the support portion 23. Specifically, the first blow-out hole section 13C and the first suction hole section 13D are located at a position higher than the height of the back plate portion 23B of the support portion 23 in a state in which the drawer body 2 is drawn into the heating cooking chamber 100A. The height of the back plate portion 23B of the support portion 23 indicates the position of the upper edge of each of the right tall portion 23B1, the left tall portion 23B3, and the short portion 23B2 in an up-down direction. In other words, even when the drawer body 2 is drawn into the heating cooking chamber 100A, none of the first blow-out hole section 13C and the first suction hole section 13D are blocked by the hack plate portion 23B of the support portion 23 when viewed from the front side toward the rear side. Specifically, all of the plurality of punched holes in the first blow-out hole section 13C and the first suction hole section 13D are located at a position higher than the height of the support portion 23. In addition, the first blow-out hole section 13C is located to be substantially left-right symmetrical when the back wall 1E is seen from the front side toward the rear side.

As illustrated in FIG. 5, the second heating chamber 14A is located outside of the ceiling wall 1C. The second partition plate 14B constitutes a substantially central portion of the ceiling wall 1C. The second partition plate 14B divides the second heating chamber 14A and the heating cooking chamber 100A. The second partition plate 14B is a plate-like member. The second partition plate 14B includes a second blow-out hole section 14C and a second suction hole section 14D. The second blow-out hole section 14C and the second suction hole section 14D are located in the central portion of the ceiling wall 1C. The second blow-out hole section 14C is formed along the outer circumference of the second suction hole section 14D. The second blow-out hole section 14C is located to be substantially left-right symmetrical when the ceiling wall 1C is seen from the lower side toward the upper side.

The second blow-out hole section 14C is an aggregate of a plurality of punched holes. Similarly, the second suction hole section 14D is also an aggregate of a plurality of punched holes. The diameter of each punched hole of the second blow-out hole section 14C and the second suction hole section 14D is, for example, 3.4 mm. Since the second blow-out hole section 14C and the second suction hole section 14D are aggregates of the plurality of punched holes, it is possible to suppress the leakage of microwaves to the outside of the heating cooking chamber 100A when the microwave heating mode is performed. In addition, the second blow-out hole section 14C or the second suction hole section 14D makes it possible to suppress the occurrence of an incident in which a fingertip of a user is cut due to the contact of the fingertip of the user with each of the second blow-out hole section 14C and the second suction hole section 14D when cleaning the inside of the heating cooking chamber 100A.

As illustrated in FIG. 5, the third heating chamber 15A is located outside of the bottom wall 1D. The oven tray 15B constitutes a substantially central portion of the bottom wall 1D. The oven tray 15B divides the third heating chamber 15A and the heating cooking chamber 100A. The oven tray 15B is a plate-like member. The oven tray 15B is attached to the heating chamber 1.

The material of the oven tray 15B includes ceramic or glass. Since the material of the oven tray 15B includes ceramic or glass, the oven tray 15B facilitates the transmission of the microwaves. Because of this, when the microwave heating mode is performed, the drawer type heating cooking apparatus 100 is able to efficiently heat and cook the object to be heated.

As illustrated in FIG. 6, the heating chamber 1 includes a first air sending unit 13. As illustrated in FIGS. 5 and 6, the heating chamber 1 includes a second air sending unit 14, a microwave supply unit 15, and a grill unit 16.

As illustrated in FIG. 6, the first air sending unit 13 supplies the first hot air F1 into the heating cooking chamber 100A. In other words, the first air sending unit 13 imparts a first hot air circulation heating function to the drawer type heating cooking apparatus 100. The first air sending unit 13 is located outside of the back wall 1E. The first air sending unit 13 includes a first heater 131, a first centrifugal fan 132, and a first drive unit 133. The heating chamber 1 includes a first wall portion 13E constituting the first heating chamber 13A. The first wall portion 13E constitutes a rear wall of the first heating chamber 13A. The first heater 131 and the first centrifugal fan 132 are housed in the first heating chamber 13A. The first drive unit 133 is located outside of the first wall portion 13E. The first heater 131 heats air. The first centrifugal fan 132 blows the air heated by the first heater 131 into the heating cooking chamber 100A via the first blow-out hole section 13C. The first centrifugal fan 132 sucks the air within the heating cooking chamber 100A via the first suction hole section 13D. The first suction hole section 13D faces a shaft direction of the first centrifugal fan 132. The first drive unit 133 drives the first centrifugal fan 132. The first drive unit 133 is, for example, a motor.

As illustrated in FIG. 5 and FIG. 6, the second air sending unit 14 supplies the second hot air F2 into the heating cooking chamber 100A. In other words, the second air sending unit 14 imparts a second hot air circulation heating function to the drawer type heating cooking apparatus 100. The second air sending unit 14 is located outside of the ceiling wall 1C. The second air sending unit 14 includes a second heater 141, a second centrifugal fan 142, and a second drive unit 143. The heating chamber 1 includes a second wall portion 14E constituting the second heating chamber 14A. The second wall portion 14E constitutes an upper face of the second heating chamber 14A. The second heater 141 and the second centrifugal fan 142 are housed in the second heating chamber 14A. The second drive unit 143 is located outside of the second wall portion 14E. The second heater 141 heats air. The second centrifugal fan 142 blows the air heated by the second heater 141 into the heating cooking chamber 100A via the second blow-out hole section 14C. The second centrifugal fan 142 sucks the air within the heating cooking chamber 100A via the second suction hole section 14D. The second suction hole section 14D faces a shaft, direction of the second centrifugal fan 142. The second drive unit 143 drives the second centrifugal fan 142. In the present embodiment, the second drive unit 143 drives the second centrifugal fan 142 so that the rotation speed of the second centrifugal fan 142 becomes higher than the rotation speed of the first centrifugal fan 132. The second drive unit 143 is, for example, a motor.

As illustrated in FIGS. 5 and 6, the microwave supply unit 15 supplies microwaves into the heating cooking chamber 100A. That is, the microwave supply unit 15 imparts a microwave heating function to the drawer type heating cooking apparatus 100. The microwave supply unit 15 is located outside of the bottom wall 1D. The microwave supply unit 15 includes a magnetron 151, a waveguide 152 a rotary antenna 153, and an antenna motor 154. The heating chamber 1 includes a third wall portion 15C constituting the third heating chamber 15A. The third wall portion 15C constitutes a lower face of the third heating chamber 15A. The third wall portion 15C includes a power supply hole part 15D. The rotary antenna 153 is housed in the third heating chamber 15A. The magnetron 151, waveguide 152, and antenna motor 154 are located outside of the third wall portion 15C. The magnetron 151 generates microwaves. The waveguide 152 propagates the generated microwaves to the power supply hole part 15D of the third wall portion 15C. As a result, the microwaves are supplied into the heating cooking chamber 100A via the rotary antenna 153. The antenna motor 154 drives the rotary antenna 153. The rotary antenna 153 agitates the microwaves and causes the microwaves to radiate into the heating cooking chamber 100A. In the present embodiment, even when the microwave heating mode is performed, the drawer type heating cooking apparatus 100 does not rotate the object to be heated.

As illustrated in FIGS. 5 and 6, the grill unit 16 supplies heat into the heating cooking chamber 100A. That is, the grill unit 16 imparts a grill heating function to the drawer type heating cooking apparatus 100. The grill unit 16 includes a heating and cooking heater unit 161 and an energization unit 162. The heating and cooking heater unit 161 is positioned on the ceiling wall 1C side in the heating cooking chamber 100A. The energization unit 162 is positioned outside of the left wall 1B. The energization unit 162 energizes the heating and cooking heater unit 161. The energized heating and cooking heater unit 161 generates heat. The heating and cooking heater unit 161 has a substantially U shape when viewed from the upper side toward the lower side. As illustrated in FIG. 6, in the present embodiment, three grill units 16 are disposed in the central portion in the front-rear direction and in the upper portion in the up-down direction.

Figure 8:
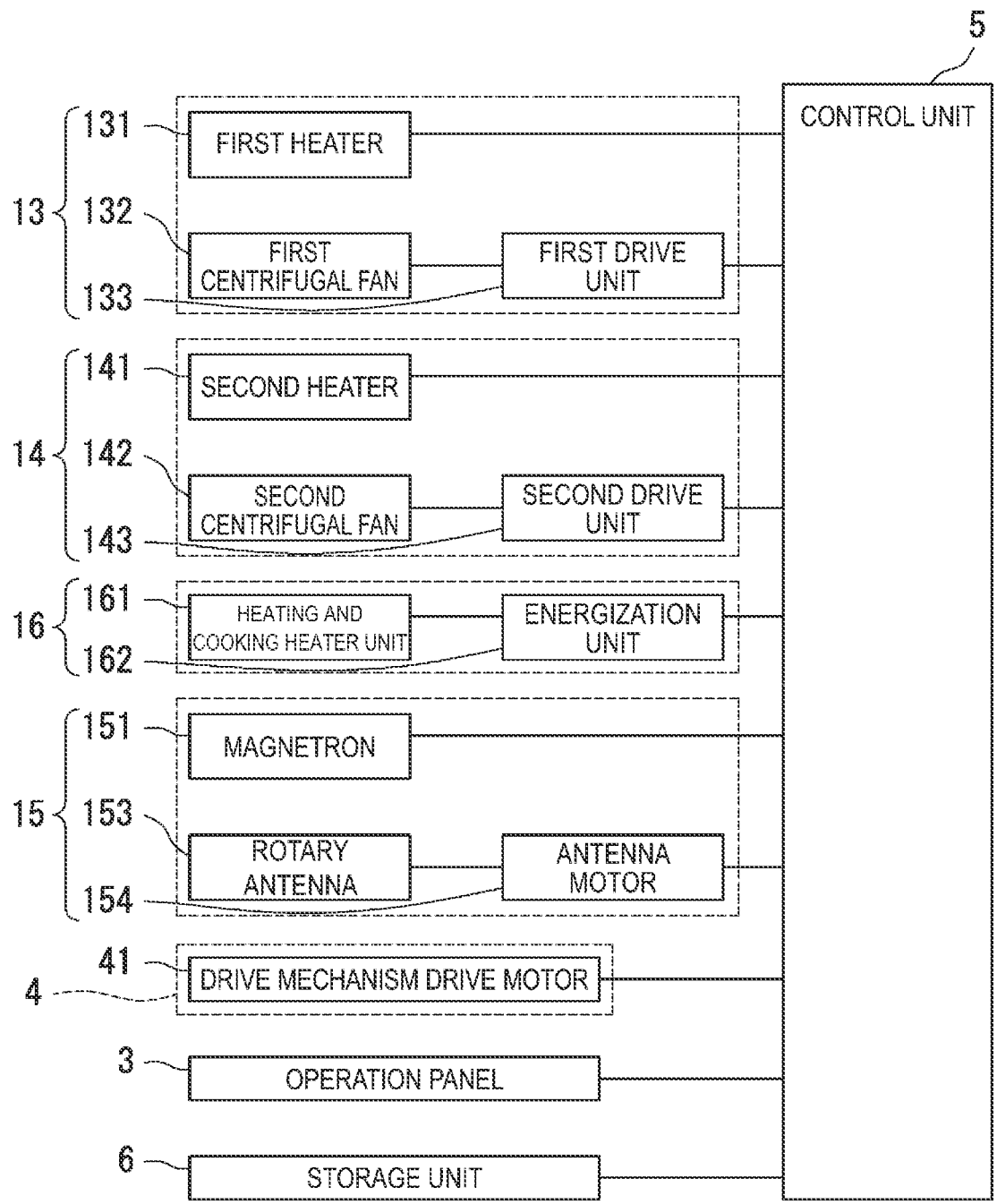
FIG. 8 is a block diagram illustrating a configuration of the drawer type heating cooking apparatus according to the embodiment of the present invention.

A configuration of the drawer type heating cooking apparatus 100 will be described in detail with reference to FIG. 8. FIG. 8 is a block diagram illustrating the configuration of the drawer type heating cooking apparatus 100 according to the present embodiment.

As illustrated in FIG. 8, the drawer type heating cooking apparatus 100 further includes the drive mechanism 4, a control unit 5, and a storage unit 6.

The drive mechanism 4 includes a drive mechanism drive motor 41 and a rack pinion mechanism. The rack pinion mechanism includes a pinion. The pinion is attached to a tip end portion of a motor shaft of the drive mechanism drive motor 41. The pinion is engaged with the rack part on the rear side of the support member 25 described above with reference to FIG. 2.

The control unit 5 is a hardware circuit that includes a processor such as a central processing unit (CPU). The control unit 5 controls the first heater 131, the first drive unit 133, the second heater 141, the second drive unit 143, the magnetron 151, the antenna motor 154, the energization unit 162, the drive mechanism drive motor 41, the operation panel 3, and the storage unit 6, by executing control programs stored in the storage unit 6.

The storage unit 6 is constituted by a random access memory (RAM) and a read only memory (ROM). The storage unit 6 stores control programs used for controlling operations of each part of the drawer type heating cooking apparatus 100. The storage unit 6 stores setting information input when the operation panel 3 is operated.

Figure 9:
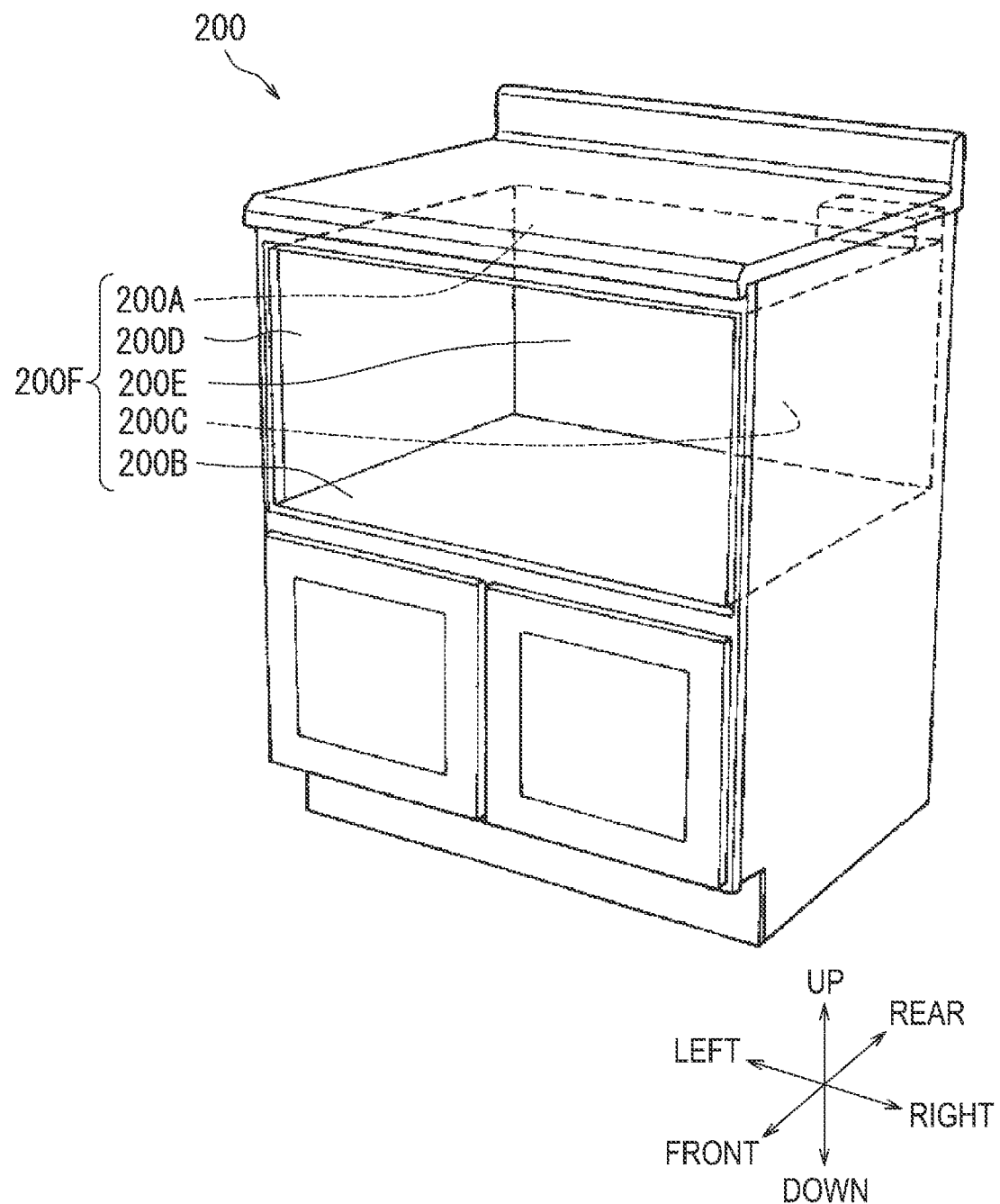
FIG. 9 is a diagram illustrating an appearance of a cabinet in which the drawer type heating cooking apparatus according to the embodiment of the present, invention is built.

Subsequently, a cabinet 200, in which the drawer type heating cooking apparatus 100 is built, will be described with reference to FIG. 9. FIG. 9 is a diagram illustrating an appearance of the cabinet 200, in which the drawer type heating cooking apparatus 100 according to the present embodiment is built.

The drawer type heating cooking apparatus 100 is installed in the cabinet 200 in built-in manner. As illustrated in FIG. 9, the cabinet 200 includes an upper wall 200A, a lower wall 200B, a right wall 200C, a left wall 200D, and a rear wall 200E. The upper wall 200A, the lower wall 200B, the right wall 200C, the left wall 200D, and the rear wall 200E form a container portion 200F. The container portion 200F is a rectangular parallelepiped space into which the drawer type heating cooking apparatus 100 is fitted.

Next, a flow of the first hot air F1 will be described with reference to FIGS. 6 and 7. When the first hot air circulation heating mode is performed, the first hot air F1 is blown from the first blow-out hole section 13C into the heating cooking chamber 100A. In other words, the first blow-out hole section 13C blows the first hot air F1 along the placement portion 22. The first hot air F1 having been blown into the heating cooking chamber 100A mainly moves forward along the right wall 1A, left wall 1B, ceiling wall 1C, and cooking tray 222. Subsequently, the first hot air F1 having reached the rear surface 21B of the door part 21 described above with reference to FIG. 2 reverses its movement direction to move backward. Subsequently, the first hot air F1 moving backward is sucked by the first suction hole section 13D. In other words, the first suction hole section 13D sucks the first hot air F1 along the placement portion 22. The first hot air F1 having been sucked by the first suction hole section 13D is heated by the first heater 131 and is blown again from the first blow-out hole section 13C into the heating cooking chamber 100A. In this manner, the first air sending unit 13 circulates the air between the first heating chamber 13A and the heating cooking chamber 100A so as to cause a temperature inside the heating cooking chamber 100A to be uniform.

Next, a flow of the second hot air F2 will be described with reference to FIGS. 5 and 6. When the second hot air circulation heating mode is performed, the second hot air F2 is blown from the second blow-out hole section 14C into the heating cooking chamber 100A. The second hot air F2 blown into the heating cooking chamber 100A moves downward. Subsequently, the second hot air F2 having reached the cooking tray 222 or the object to be heated reverses its movement direction to move upward. The second hot air F2 moving upward is sucked by the second suction hole section 14D. The second hot air F2 having been sucked by the second suction hole section 14D is heated by the second heater 141 and is blown again from the second blow-out hole section 14C into the heating cooking chamber 100A. In this manner, the second air sending unit 14 circulates the air between the second heating chamber 14A and the heating cooking chamber 100A. When the second hot air circulation heating mode is the first mode, the second hot air F2 is directly blown onto the upper face of the object to be heated. As a result, the object to be heated is heated and cooked. When the second hot air circulation heating mode is the second mode, the second air sending unit 14 circulates the air between the second heating chamber 14A and the heating cooking chamber 100A to preheat the inside of the heating cooking chamber 100A in a short amount of time, as a pre-stage of heating and cooking the object to be heated.

In the present embodiment, as described above with reference to FIGS. 1 to 9, the first blow-out hole section 13C is located at a position higher than the height of the back plate portion 23B of the support portion 23 in a state in which the drawer body 2 is drawn into the heating cooking chamber 100A. As a result, the first hot air F1 blown from the first blow-out hole section 13C by the first hot air circulation heating mode being performed, is unlikely to be blown onto the back plate portion 23B of the support portion 23. Therefore, the drawer body 2 is unlikely to have a high temperature compared to a case where the first hot air F1 is blown directly onto the back plate portion 23B of the support portion 23 from the first blow-out hole section 13C. As a result, it is possible for the drawer type heating cooking apparatus 100 to suppress the deterioration in durability of the drawer body 2.

The drawer type heating cooking apparatus 100 is located at a position higher than the height of the back plate portion 23B of the support portion 23 in a state where the drawer body 2 is drawn into the heating cooking chamber 100A. This makes it possible for the drawer type heating cooking apparatus 100, by the first hot air circulation heating mode being performed, to improve heating efficiency in the heating cooking chamber 100A due to a rapid increase in temperature inside the heating cooking chamber 100A. As a result, the drawer type heating cooking apparatus 100 may also improve the heating efficiency of the object to be heated.

In the present embodiment, as described above with reference to FIGS. 1 to 9, the back plate portion 23B includes the right tall portion 23B1, left tall portion 23B3, and short portion 23B2. The short portion 23B2 is located between the right tall portion 23B1 and the left tall portion 23B3. As a result, the first hot air F1 blown from the first blow-out hole section 13C by the first hot air circulation heating mode being performed, is likely to move along the top surface portion 222A of the cooking tray 222. As a result, is possible for the drawer type heating cooking apparatus 100 to reduce generation of temperature irregularities in the heating cooking chamber 100A.

As described above with reference to FIGS. 1 to 9, in the present embodiment, the heating chamber 1 includes the first air sending unit 13 and the second air sending unit 14. The heating chamber 1 includes the first blow-out hole section 13C, the second blow-out hole section 14C, the first suction hole section 13D, and the second suction hole section 14D. With the above configuration, the drawer type heating cooking apparatus 100 is able to perform heating and cooking in different heating conditions. Specifically, the drawer type heating cooking apparatus 100 is able to perform the first hot air circulation heating mode or second hot air circulation heating mode.

As described above with reference to FIGS. 1 to 9, in the present embodiment, the back wall 1E includes the first partition plate 13B. The ceiling wall 1C includes the second partition plate 14B. As a result, the drawer type heating cooking apparatus 100 may blow the first hot, air F1 from the back wall 1E by the drive of the first air sending unit 13, and then suck it. The drawer type heating cooking apparatus 100 may blow the second hot air F2 from the ceiling wall 1C, and then suck it.

In the present embodiment, as described above with reference to FIGS. 1 to 9, the first suction hole section 13D is located in the central portion of the back wall 1E. The first blow-out hole section 13C is located in the peripheral edge portion of the back wall 1E. The second suction hole section 14D and the second blow-out hole section 14C are located in the central portion of the ceiling wall 1C. This makes it possible for the drawer type heating cooking apparatus 100 to uniformly heat the object to be heated by drive of the first air sending unit 13. Furthermore, the drawer type heating cooking apparatus 100 may burn the surface on the ceiling wall 1C side of the object to be heated by drive of the second air sending unit 14.

As described above with reference to FIGS. 1 to 9, in the present embodiment, the grill unit 16 includes the heating and cooking heater unit 161 located inside the heating cooking chamber 100A. With the above configuration, the drawer type heating cooking apparatus 100 is able to perform heating and cooking by radiant heat.

In the present embodiment, as described above with reference to FIGS. 1 to 9, the heating and cooking heater unit 161 is located on the ceiling wall 1C side. The microwave supply unit 15 is located outside of the bottom wall 1D. This makes it possible for the drawer type heating cooking apparatus 100 to supply the microwaves generated by drive of the microwave supply unit 15 into the heating cooking chamber 100A without being blocked by the heating and cooking heater unit 161.

The embodiment of the present invention has been described with reference to the drawings (FIG. 1 to FIG. 9). Note that the present invention is not limited to the embodiment described above, and may be carried out in the form of various aspects within the scope not departing from the gist of the present invention (for example, (1) to (11) described below). The drawings primarily schematically illustrate each of the constituent elements for the sake of easier understanding, and the thickness, length, quantity, and the like of each of the illustrated constituent elements are different from the actual thickness, length, quantity, and the like by reason of creation of the drawings. The material, shape, dimensions, and the like of each of the constituent elements illustrated in the embodiment described above are merely exemplary and are not particularly limited, and various modifications can be made within the scope not departing from the effects of the present invention in essence.

(1) As described above with reference to FIG. 1 to FIG. 9, the back wall 1E of the heating chamber 1 includes the first partition plate 13B, but the present invention is not limited thereto. The back wall 1E of the heating chamber 1 may not include the first partition plate 13B. For example, at least one of the right wall 1A and the left wall 1B of the heating chamber 1 may include the first partition plate 13B. That is, the first hot air F1 may be blown from at least one of the right wall 1A and the left wall 1B of the heating chamber 1. When the first hot air F1 is blown from the right wall 1A of the heating chamber 1, it is sufficient for the first blow-out hole section 13C to be located at a position higher than the height of the right plate portion 23C of the support portion 23. Likewise, when the first hot, air F1 is blown from the left wall 1B of the heating chamber 1, it is sufficient for the first blow-out hole section 13C to be located at a position higher than the height of the left plate portion 23D of the support portion 23.

(2) As described above with reference to FIGS. 1 to 9, the first, suction hole section 13D is located in the central portion of the back wall 1E of the heating chamber 1, and the first blow-out hole section 13C is located in the peripheral edge portion of the hack wall 1E, but the present invention is not limited thereto. The first suction hole section 13D may not be located in the central portion of the back wall 1E of the heating chamber 1. The first blow-out hole section 13C may not be located in the peripheral edge portion of the back wall 1E.

(3) As described above with reference to FIG. 1 to FIG. 9, the back plate portion. 23B of the support portion 23 includes the short portion 23B2, but the present invention is not limited thereto. The back plate portion 23B of the support portion 23 may not include the short portion 23B2.

(4) As described above with reference to FIG. 1 to FIG. 9, the drawer type heating cooking apparatus 100 includes the first air sending unit 13 and the second air sending unit 14, but the present invention is not limited thereto. For example, the drawer type heating cooking apparatus 100 may include at least one of the first air sending unit 13 and the second air sending unit 14. The drawer type heating cooking apparatus 100 may further include an air sending unit that is different from the first air sending unit 13 and the second air sending unit 14.

(5) As described above with reference to FIGS. 1 to 9, the back wall 1E of the heating chamber 1 includes the first partition plate 13B, and the ceiling wall 1C of the heating chamber 1 includes the second partition plate 14B, but the present invention is not limited thereto. For example, the back wall 1E of the heating chamber 1 may include the second partition plate 14B, and the ceiling wall 1C of the heating chamber 1 may include the first, partition plate 13B. Further, one of the right wall 1A, left wall 1B, ceiling wall 1C, bottom wall 1D, and back wall 1E of the heating chamber 1 may include the first partition plate 13B and the second partition plate 14B.

(6) As described above with reference to FIGS. 1 to 9, the second suction hole section 14D and the second blow-out hole section 14C are located in the central portion of the ceiling wall 1C, but the present invention is not limited thereto. For example, the second suction hole section 14D may be located in the central portion of the ceiling wall 1C, and the second blow-out hole section 14C may be located in the peripheral edge portion of the ceiling wall 1C.

(7) As described above with reference to FIG. 1 to FIG. 9, the drawer type heating cooking apparatus 100 includes the grill unit 16, but the present invention is not limited thereto. The drawer type heating cooking apparatus 100 may not include the grill unit 16. Although the drawer type heating cooking apparatus 100 includes the microwave supply unit 15, the present invention is not limited thereto. The drawer type heating cooking apparatus 100 may not include the microwave supply unit 15.

(8) As described above with reference to FIGS. 1 to 9, the heating and cooking heater unit 161 of the grill unit 16 is located on the ceiling wall 1C side, and the microwave supply unit 15 is located outside of the bottom wall 1D of the heating chamber 1, but the present invention is not limited thereto. For example, the heating and cooking heater unit 161 of the grill unit 16 may be located on at least one of the right wall 1A side and the left wall 1B side, and the microwave supply unit 15 may be located outside of the ceiling wall 1C of the heating chamber 1. The grill unit 16 and the microwave supply unit 15 may be disposed on the same wall side of the heating chamber 1.

(9) As described above with reference to FIG. 1 to FIG. 9, the drawer tray 221 is fixed to the bottom plate portion 23A of the support portion 23, but the present invention is not limited thereto. For example, the drawer tray 221 may be detachably mounted on the support portion 23. The drawer tray 221 and the support portion 23 may be integrally formed.

(10) As described above with reference to FIG. 1 to FIG. 9, each of the first blow-out hole section 13C, first suction hole section 13D, second blow-out hole section 14C, and second suction hole section 14D is an aggregate of the plurality of punched holes, but the present invention is not limited thereto. For example, each of the first blow-out hole section 13C, first suction hole section 13D, second blow-out hole section 14C, and second suction hole section 14D may be one opening portion, may be a plurality of slit holes, or may be a net-like section.

(11) The drawer type heating cooking apparatus 100 may include a net rack. The net rack is set on the top surface portion 222A of the cooking tray 222, for example.

INDUSTRIAL APPLICABILITY

The present invention is useful in the field of drawer type heating cooking apparatuses, for example.

REFERENCE SIGNS LIST

1 Heating chamber
13 First air sending unit
13A First heating chamber
13B First partition plate
13C First blow-out hole section
13D First suction hole section
131 First heater
132 First centrifugal fan
15 Microwave supply unit
2 Drawer body
22 Placement portion
23 Support portion
100 Drawer type heating cooking apparatus
100A Heating cooking chamber

The invention claimed is:

1. A drawer type heating cooking apparatus, comprising:
a heating cooking chamber;
a drawer body configured to be drawn from the heating cooking chamber and to be accommodated in the heating cooking chamber;
an air sending unit configured to supply hot air into the heating cooking chamber; and
a partition plate,
wherein the partition plate includes a blow-out hole section through which the hot air blows into the heating cooking chamber, and a suction hole section through which the hot air within the heating cooking chamber is sucked,
the drawer body includes a placement portion in which an object to be heated is placed, and a support portion configured to support the placement portion,
the blow-out hole section is located at a position higher than a height of the support portion,
the heating cooking chamber includes a back wall,
the back wall includes the partition plate,
the support portion includes a back plate portion facing the back wall,
the blow-out hole section is further located along an edge of the back wall at a position higher than a height of the back plate portion,
the back plate portion includes a tall portion and a short portion with a height lower than a height of the tall portion, and
at least a part of the blow-out hole section that is located between an upper edge of the tall portion and an upper edge of the short portion in an up-down direction is not blocked by the back plate portion when viewed from a front side toward a rear side.

2. A drawer type heating cooking apparatus, comprising:
a heating chamber with a heating cooking chamber formed inside, the heating cooking chamber being configured to heat an object to be heated;
a drawer body configured to be drawn from the heating chamber and to be accommodated in the heating cooking chamber;
a microwave supply unit configured to supply microwaves into the heating cooking chamber; and
an air sending unit configured to supply hot air into the heating cooking chamber,
wherein the air sending unit includes a heater configured to heat air, and a centrifugal fan configured to blow the air heated by the heater into the heating cooking chamber to generate the hot air,
the heating chamber includes a first heating chamber configured to house the heater and the centrifugal fan, and a partition plate configured to divide the first heating chamber and the heating cooking chamber,
the partition plate includes a blow-out hole section through which the hot air blows into the heating cooking chamber, and a suction hole section through which the hot air within the heating cooking chamber is sucked,
the drawer body includes a placement portion in which the object to be heated is placed, and a support portion configured to support the placement portion,
the blow-out hole section is located at a position higher than a height of the support portion in a state in which the drawer body is drawn into the heating cooking chamber,
the heating chamber includes a back wall forming the heating cooking chamber,
the back wall includes the partition plate,
the support portion includes a back plate portion facing the back wall,
the blow-out hole section is further located along an edge of the back wall at a position higher than a height of the back plate portion,
the back plate portion includes a tall portion and a short portion with a height lower than a height of the tall portion, and
at least a part of the blow-out hole section that is located between an upper edge of the tall portion and an upper edge of the short portion in an up-down direction is not blocked by the back plate portion when viewed from a front side toward a rear side.

3. The drawer type heating cooking apparatus according to claim 1,
wherein the tall portion includes a first tall portion and a second tall portion,
the short portion is located between the first tall portion and the second tall portion in a left-right direction, and
at least a part of the hot air is blown from the part of the blow-out hole section that is located between the upper edge of the tall portion and the upper edge of the short portion along the placement portion.

4. The drawer type heating cooking apparatus according to claim 2,
wherein the tall portion includes a first tall portion and a second tall portion,
the short portion is located between the first tall portion and the second tall portion in a left-right direction, and
at least a part of the hot air is blown from the part of the blow-out hole section that is located between the upper edge of the tall portion and the upper edge of the short portion along the placement portion.

5. The drawer type heating cooking apparatus according to claim 1, further comprising:
a cooking tray that is detachably mounted on the placement portion, wherein the cooking tray includes a top surface portion, an annular peripheral wall portion, and an annular edge,
the top surface portion forms a placement surface for the object to be heated,
the annular peripheral wall portion is erected from a peripheral edge portion of the top surface portion,
the annular edge extends outward from an upper end of the annular peripheral wall portion, and
an upper face of the annular edge is located at a position lower than the height of the back plate portion in a state in which the cooking tray is mounted on the placement portion.

6. The drawer type heating cooking apparatus according to claim 2, further comprising:
a cooking tray that is detachably mounted on the placement portion,
wherein the cooking tray includes a top surface portion, an annular peripheral wall portion, and an annular edge,
the top surface portion forms a placement surface for the object to be heated,
the annular peripheral wall portion is erected from a peripheral edge portion of the top surface portion,
the annular edge extends outward from an upper end of the annular peripheral wall portion, and
an upper face of the annular edge is located at a position lower than the height of the back plate portion in a state in which the cooking tray is mounted on the placement portion.

* * * * *